(12) United States Patent
Althues et al.

(10) Patent No.: US 11,990,599 B2
(45) Date of Patent: May 21, 2024

(54) METHOD FOR PRODUCING A DRY FILM, ROLLING DEVICE

(71) Applicants: FRAUNHOFER-GESELLSCHAFT ZUR FOERDERUNG DER ANGEWANDTEN FORSCHUNG E.V., Munich (DE); TECHNISCHE UNIVERSITAT DRESDEN, Dresden (DE)

(72) Inventors: Holger Althues, Dresden (DE); Sebastian Tschoecke, Dresden (DE); Benjamin Schumm, Dresden (DE); Stefan Kaskel, Dresden (DE); Christian Girsule, Dresden (DE); Daniel Jordan, Dresden (DE); Kay Schoenherr, Dresden (DE)

(73) Assignees: FRAUNHOFER-GESELLSCHAFT ZUR FOERDERUNG DER ANGEWANDTEN FORSCHUNG E.V., Munich (DE); TECHNISCHE UNIVERSITAT DRESDEN, Dresden (DE)

( * ) Notice: Subject to any disclaimer, the term of this patent is extended or adjusted under 35 U.S.C. 154(b) by 24 days.

(21) Appl. No.: 16/613,138

(22) PCT Filed: May 14, 2018

(86) PCT No.: PCT/EP2018/062334
§ 371 (c)(1),
(2) Date: Nov. 13, 2019

(87) PCT Pub. No.: WO2018/210723
PCT Pub. Date: Nov. 22, 2018

(65) Prior Publication Data
US 2021/0320288 A1   Oct. 14, 2021

(30) Foreign Application Priority Data

May 16, 2017   (DE) ..................... 10 2017 208 220.8

(51) Int. Cl.
*H01M 4/04*   (2006.01)
*H01M 4/485*   (2010.01)
(Continued)

(52) U.S. Cl.
CPC ....... *H01M 4/0435* (2013.01); *H01M 4/0404* (2013.01); *H01M 4/485* (2013.01);
(Continued)

(58) Field of Classification Search
None
See application file for complete search history.

(56) References Cited

U.S. PATENT DOCUMENTS 6,368,365 B1   4/2002   Chi et al.
7,352,558 B2   4/2008   Zhong et al.
(Continued)

FOREIGN PATENT DOCUMENTS

CN   103907226   7/2014
CN   104170125   11/2014
(Continued)

OTHER PUBLICATIONS

Japanese Office Action.
(Continued)

*Primary Examiner* — Zhongqing Wei
(74) *Attorney, Agent, or Firm* — Jacobson Holman PLLC

(57) ABSTRACT

The invention relates to a method for producing a dry film (3), wherein a dry powder mixture is processed into the dry film (3) by a rolling device comprising a first roller (2a) and a second roller (2b). The first roller (2a) has a higher
(Continued)

circumferential rotational speed than the second roller (2*b*), and the dry film (3) is placed on the first roller (2*a*).

14 Claims, 1 Drawing Sheet

(51) Int. Cl.
*H01M 4/505* (2010.01)
*H01M 4/525* (2010.01)
*H01M 4/58* (2010.01)
*H01M 4/62* (2006.01)
*H01M 4/66* (2006.01)
*H01M 10/0525* (2010.01)

(52) U.S. Cl.
CPC ........... *H01M 4/505* (2013.01); *H01M 4/525* (2013.01); *H01M 4/58* (2013.01); *H01M 4/623* (2013.01); *H01M 4/662* (2013.01); *H01M 10/0525* (2013.01)

(56) References Cited

U.S. PATENT DOCUMENTS

| | | |
|---|---|---|
| 2004/0182695 A1 | 9/2004 | Bulan et al. |
| 2005/0266298 A1 | 12/2005 | Mitchell et al. |
| 2010/0224893 A1* | 9/2010 | Liepold .................. C23C 26/00 |
| | | 257/98 |
| 2013/0157141 A1 | 6/2013 | Zhong et al. |
| 2014/0342225 A1 | 11/2014 | Isshiki et al. |
| 2015/0224529 A1* | 8/2015 | Hamabe ................ B05C 11/025 |
| | | 118/227 |
| 2016/0190600 A1 | 6/2016 | Cui et al. |
| 2016/0196931 A1* | 7/2016 | Nose ....................... H01G 11/86 |
| | | 264/105 |
| 2017/0040591 A1 | 2/2017 | Nakano |

FOREIGN PATENT DOCUMENTS

| | | |
|---|---|---|
| CN | 104835937 | 8/2015 |
| CN | 105609710 | 5/2016 |
| DE | 102010044552 | 4/2015 |
| DE | 102014208145 | 9/2015 |
| JP | 57046470 | 3/1982 |
| JP | 3111195 | 11/2000 |
| JP | 2010171366 | 8/2010 |
| JP | 2013-077560 | 4/2013 |
| JP | 2015164717 | 9/2015 |
| JP | 2015-508220 | 3/2016 |
| KR | 20110074810 | 7/2011 |

OTHER PUBLICATIONS

Chinese Office Action.
European Office Action.
Korean Office Action.
International Search Report dated Aug. 27, 2018.
German Office Action dated Jan. 30, 2018.

* cited by examiner

METHOD FOR PRODUCING A DRY FILM, ROLLING DEVICE

The present invention relates to a method for producing a substrate, a rolling device, a dry film, and a substrate coated with the dry film.

In the production of battery electrodes, 50 μm to 100 μm thick layers have to be applied at high web speeds to metallic current collectors. This is typically realized by means of wet chemical roll-to-roll processes from suspensions of active materials in aqueous or organic solvents. For this, a high energy input is necessary both for the dispersion of the active material and for the drying of the layer. Efforts are increasingly been made to realize the coating in a solvent-free, thus dry, manner. For this, dry powder mixtures of active material, conductive additives and suitable binders have to be converted into mechanically load-bearing layers.

Methods in which, as disclosed in U.S. Pat. No. 7,352,558 B2, a pressing into a free-standing film is realized are known from the prior art. To this end, a three-stage process, in which a dry powder mixture is fibrillated by means of an air jet mill, powder is conveyed into a calender nip, in which it is pressed into the free-standing film, and the free-standing film is applied to a current collector, is usually conducted. Although this method enables continuous processing, the multi-stage nature and, above all, the intermediate step of a hard-to-handle free-standing film are problematical.

In another method, which is disclosed in DE 10 2010 044 552 B4, the dry powder mixture is applied to the target substrate by means of electrostatic charging and downstream heat treatment for mechanical stabilization by a thermoplastic binder. A drawback with this is that the application of powder must be followed by a sealing treatment or mechanical stabilization by calendering, and thus an additional process step is necessary. Moreover, for this method planar target substrates must be used.

From DE 10 2014 208 145 B3, a battery cell having a coated electrode, and the production thereof, is known.

A battery having a recyclable electrode which is based on dry particles.

The object of the present invention is therefore to propose a method which avoids said drawbacks and with which, therefore, dry films can be applied to a substrate in an efficient and mechanically stable manner.

This object is achieved according to the invention by a method, a rolling device, a dry film, a substrate, coated with the dry film, and an electrochemical element according to the claims.

In a method for producing a dry film, a dry powder mixture is processed into the dry film by a rolling device, which has a first roll and a second roll. The first roll has in this case a higher rotational peripheral speed than the second roll and the resulting dry film is mounted on the first roll.

By the rolling device operated at different rotational peripheral speeds of the two rolls, a mechanical stabilization and film formation on the first roll, which rotates faster than the second roll, is achieved. The formation of a free-standing film is thus avoided and a further processing of the dry film supported or mounted on the first roll can be realized.

Typically, the dry film, after the processing of the two rolls, is applied to a substrate, preferably laminated to the substrate, alternatively or additionally this can be done, however, already in the generation of the dry film. Insofar as the substrate has sufficient roughness, for instance is designed as a metal wire mesh or carbon fiber mat, the dry film can also, due to an effected interlocking, also be pressed to the substrate. However, it can also be provided to release the dry film from the first roll, for instance by means of a doctor blade. Owing to the different roll speeds (which influence a spacing of structures forming in the dry film) and to a pressing force (which has an influence on a structural height of these structures), the produced dry film typically has a fibrillar structure with a roughness $R_a$ of 10 μm or less.

It can be provided that a ratio of the rotational peripheral speed of the first roll to the rotational peripheral speed of the second roll lies between 10:9 and 10:1. Preferably, a ratio of 10:7 to 10:3, particularly preferably of 2:1, is maintained. As a result, to the powder in the gap between the two rolls is applied a shearing force, which produces a fibrillation along the running direction. The dry film can thus be formed with a corrugated structure, in which, owing to the different roll speeds, a periodicity of the structure is discernible.

A circumference of the first roll typically corresponds to a circumference of the second roll, so that a simple construction with two rolls of same diameter is obtained. However, it can also be provided—for instance in order to achieve defined rotation speeds with due regard to the respective circumference—to design the first roll and the second roll with different diameters, and thus different roll circumferences.

The rolling device can be configured as a calender rolling device. By heatable rolls, a further compaction of the dry film can be achieved. By heatable rolls or at least one heatable roll, the formation of the fibrillar structure can be promoted. In the case of a polytetrafluoroethylene (PTFE) binder, a temperature of the at least one heatable roll should lie between 80° C. and 120° C.

Preferredly, the second roll, which has a lower rotational peripheral speed than the first roll, is provided with a modification, preferably a coating on its surface, which coating is repellant and/or adhesion-reducing with respect to the forming dry film, so that the dry film can be more easily removed. The coating can comprise polytetrafluoroethylene (PTFE), silicone and/or diamond-like carbon, or consist thereof. Alternatively or additionally, the first roll can have a corresponding modification, which has an adhesion-enhancing effect on the forming dry film. The modification can also be realized by a roughened surface, for instance in that the first roll has a surface with greater roughness than the second roll. In particular, the surface of the second roll can be polished smooth.

The dry film is typically applied, preferably laminated, to a substrate and, for the application or lamination, is moved at a speed corresponding to the rotational peripheral speed of the first roll. This enables a fluid transfer of the dry film from the first roll to the substrate due to the mutually adapted speeds.

Preferredly, the substrate is moved over the first roll while the dry film is formed on the substrate. As a result, a direct formation of the dry layer, which takes places simultaneously with the movement of the substrate, is promoted. If the substrate, together with a primer foil, is fed directly over the first roll, an adhesion-enhancing layer can be applied to the substrate.

It can be provided that the dry film is formed by the first roll and the second roll with a linear force, acting between the first roll and the second roll in the nip, of 100 N/cm to 10 kN/cm, preferably 400 N/cm, in order to achieve a sufficient mechanical compaction of the dry film.

Typically, the substrate is formed of a metallic material or comprises this metallic material, in order to be able to serve as an electrode for an energy storage unit.

Prior to the lamination of the dry film on a respective surface provided for the application or lamination, the substrate can be provided with a primer and/or a binder. Thus an improved connection is achieved. Preferredly, a thermoplastic primer and/or a thermoplastic binder is used for this purpose. Alternatively or additionally, a reactive primer or an adhesive can also be used. The primer layer can comprise conductive rust and/or a thermoplastic component, preferably polyvinyl pyrrolidone (PVP). Preferably, the substrate is formed of an expanded metal, a metal wire mesh, a nonwoven fabric, a substrate having a structured surface which allows mechanical interlocking, or a metal foil, preferably a copper foil or an aluminum foil. Particularly preferredly, a copper foil or an aluminum foil is used, to which a carbon primer is applied.

The dry film is typically formed with a thickness less than 500 μm, preferably less than 300 μm, particularly preferably less than 150 μm, in order to obtain a thinnest possible and, at the same time, mechanically stable dry film.

Typically, a dry powder mixture, which contains or comprises polytetrafluoroethylene, a conductive additive, for instance carbon nanotubes, is used. For a carbon/sulfur cathode, the dry powder mixture can comprise porous carbon (for instance porous rust or carbon nanotubes), sulfur, polytetrafluoroethylene and, where appropriate, a further conductive additive. For a lithium ion electrode, besides polytetrafluoroethylene and an additional conductive additive, an active material, preferably lithium ferrophosphate (LFP), lithium manganese oxide (LMO), nickel manganese cobalt (NMC), nickel-rich lithium nickel manganese cobalt oxide (NMC 622 or NMC 811), lithium nickel cobalt aluminum oxide (NCA), lithium cobalt oxide (LCO), lithium manganese nickel oxide (LMNO), and/or lithium titanate (LTO), can also be used. Particularly advantageous is the described method for cathode materials in lithium ion batteries, since these are only rarely processed aqueously.

In a rolling device for implementing the method, a dry powder mixture is fed out of a powder conveyor into the nip between a first calender roll and a second calender roll. The first and the second calender roll are configured or driven such that the first calender roll has a higher rotational peripheral speed than the second calender roll, and the first and the second calender roll respectively have an opposite direction of rotation.

In addition to the dry powder mixture, a substrate, in particular a foil or a mesh, can be fed through the nip.

It is sometimes necessary, including, for instance, for battery applications, to conduct a so-called intermittent coating. This allows the coating in the form of strips transversely to the direction of coating. To this end, the coating is suspended at regular and precisely synchronized intervals, so that uncoated strips are formed. This synchronization and the precision of the producible shapes, and the exactness of the edges, is limitedly possible. In this way, the process speed for an intermittent formation of dry films and a coating onto a substrate can be reduced by half in comparison to continuous coatings (~30 m/min instead of ~60 m/min).

With the method according to the invention, it is possible to achieve such a structuring through the use of an adhesion-enhancing primer layer on the respective substrate surface. For this, it is necessary to previously coat the substrate surface onto which the dry film is to be formed, in the desired geometry, with the adhesion-enhancing primer layer. Since it is here just a case of an (in dry state) approximately 1 μm thick layer, it is easier to structure the primer layer instead of the actual electrode layer (various printing or spraying processes). Optional geometries (rectangular, but also round or other) are possible. In such a method (for example FIG. 2), the dry film layer would continue to be formed fully on the more rapidly rotating first calender roll. However, only at those places where the substrate surface is provided with a primer layer does the layering with the dry film take place. The excess dry film (not transferred to the substrate surface) is removed from the first calender roll, reprocessed, and can be reused. In this way, optional geometries can be realized with good precision without reduction of the process speeds.

Also two calender roll pairs comprising first and second calender rolls can be arranged side by side In mirror symmetry such that between two first calender rolls is configured a nip, through which dry film is applied on two sides of a substrate likewise fed through this nip, and the two first calender rolls have an opposite direction of rotation.

In a further embodiment, a further first calender roll, which rotates about a rotational axis, can be present, onto which a dry film formed between the first calender roll and the second calender roll can be wound following exit from the nip. The two first calender rolls should have the same rotational peripheral speed. In this embodiment, a substrate, preferredly a foil, can be fed with the dry film through the nip between first calender roll and second calender roll and wound onto the further first calender roll.

A dry film has anisotropically formed fibrils. By shearing in the nip, these fibrils are preferredly formed anisotropically in the running direction of the first roll and of the second roll. A length of the fibrils lies within the range between 0.1 μm and 1000 μm. Alternatively or additionally, the dry film with the fibrils can have a roughness $R_a$ of below 10 μm. The dry film is typically arranged on a substrate.

Preferably, an electrochemical store or an electrochemical converter has a dry film having the described characteristics, or a substrate provided with the dry film and having the described characteristics.

The dry film and the substrate with the dry film are preferredly produced according to the described method, thus the described method is configured to produce the dry film and the substrate with the dry film.

For the production, a non-flowable powder mixture can also be used. This non-flowability can here be determined under the test conditions according to German standard EN ISO 6186: 1998 (as of August 1998).

Illustrative embodiments of the invention are represented in the drawings and are explained below with reference to FIGS. 1 to 3, wherein.

Figure 1:
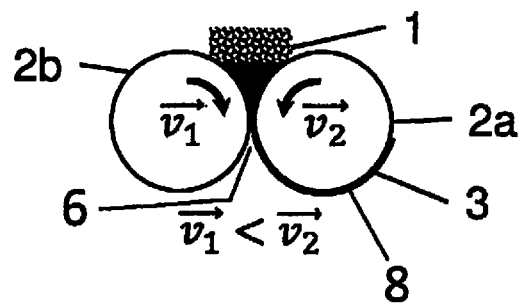
FIG. 1 shows a lateral schematic view of a rolling device.

In FIG. 1 is represented in a schematic lateral view a rolling device, in which, from a powder conveyor 1, a dry powder mixture stored in the powder conveyor 1 makes its way onto two, in terms of their dimensions, identical chrome-plated calender rolls 2a and 2b and is transformed by these, by means of acting pressing and shearing forces, into a stable state. The first calender roll 2a is herein operated at a higher rotation speed than the second calender roll 2b, so that a forming dry film 3 remains on the first calender roll 2a after the combined pressing and shearing operation.

In the represented illustrative embodiment, the used dry powder exists in the premixed state and comprises 90 percent by weight Ketjenblack/sulfur (1:2 m/m), 3 percent by weight polytetrafluoroethylene (PTFE) and 7 percent by weight multi-walled carbon nanotubes (MWCNT). For a lithium ion electrode, 95 percent by weight lithium manganese oxide, 3 percent by weight a conductive additive (in this case multi-walled carbon nanotubes, MWCNT) and 2 percent by weight PTFE is typically used. In a calender nip located between the first roll 2a and the second roll 2b, a fibrillation of the dry powder mixture takes place, whereby the closed dry film 3 is produced.

The rotation speeds of the first roll 2a and of the second roll 2b lie within a range between 10:9 and 10:4, in the shown illustrative embodiment around 2:1, namely either 10 mm/s:5 mm/s or 20 mm/s:10 mm/s. In further Illustrative embodiments, depending on the parameter window and powder condition, 80 mm/s:40 mm/s can however also be used as the rotation speeds. Higher rotation speeds hereupon result in thinner dry films having a less pronounced corrugated structure or less pronounced fibrils 8, thus a lower surface roughness $R_a$. In the shown illustrative embodiment, the fibrils 8 have a length of, on average, 10 μm, and are formed anisotropically in the running direction of the rolls 2a and 2b. As a result of the rotation speeds, to the powder in the nip 6, which latter, in the represented illustrative embodiment, has a width of 50 μm but can also be between 10 μm and 300 μm in width, is applied a shearing force, which produces a fibrillation along the running direction. This results in a mechanical stabilization and film formation on the first roll 2a rotating at higher speed, and the formation of a free-standing film is avoided (where necessary, however, can be achieved by mechanical removal, for instance by means of a doctor blade, from the roll 2a). Instead, a dry film 3 supported on the faster roll 2a is obtained, which is of advantage, especially for dry films having a thickness less than 200 μm, due to the limited mechanical stability.

In the represented illustrative embodiment, the first roll 2a and the second roll 2b can respectively be heated to a temperature of 100° C. Moreover, the first roll 2a can be provided with an adhesion-enhancing surface, to which the dry film 3 adheres, while the second roll 2b has a, for the dry film, adhesion-reducing surface. In the represented illustrative embodiment, an acting linear force between the first roll 2a and the second roll 2b amounts to 400 N.

By subsequent lamination to a current collector provided with thermoplastic primer or binder, the dry film 3 can be removed from the first roll 2a, and thus, for instance, an electrode produced in a solvent-free manner can be generated.

Figure 2:
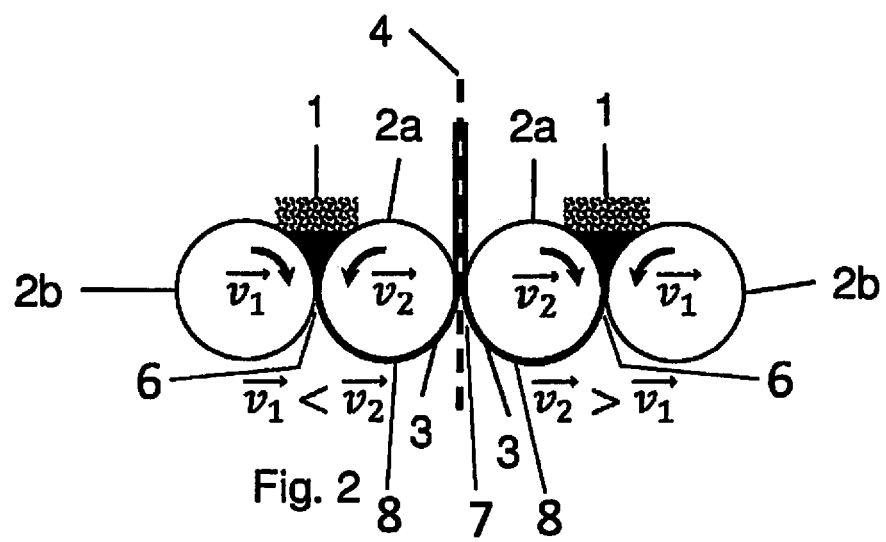
FIG. 2 shows a view, corresponding to FIG. 1, of a double rolling device.

In FIG. 2 is represented, in a view corresponding to FIG. 1, an illustrative embodiment in which a symmetrical construction made up of two of the rolling devices shown in FIG. 1 exists. Recurring features are in this figure, as also in the following figure, provided with identical reference symbols.

In the represented illustrative embodiment, the substrate 4 is fed through a further nip 7 between two first rolling devices 2a, which are arranged in mirror symmetry to one another. The two first rolls 2a, on which respectively one of the dry films 3 is run, are mutually facing and have a further nip 7 between them, so that the substrate 4 can on both sides be provided with the dry film 3, since both surfaces are respectively facing toward one of the rolls 2a. To this end, the substrate 4 is moved at a speed which precisely corresponds to the rotational peripheral speed of the two first rolls 2a. In the shown illustrative embodiment, the two rolling devices, apart from the mirror-symmetrical arrangement, are identically constructed, thus have, in particular, equal dimensions, and are operated at equal rotation speeds or rotational peripheral speeds. In further Illustrative embodiments, dry films 3 which differ from one another in terms of their composition can also be applied to the substrate 4, yet in the illustrative embodiment represented in FIG. 2 the dry films 3 are identical.

Moreover, the described method allows the production of an electrode with alternative current collectors as the substrate 4, for example perforated substrates with low basis weight, such as perforated metal foils or conductive fabrics. In the illustrative embodiment shown in FIG. 2, the substrate 4 is an aluminum foil having a carbon primer as the two-sided coating.

A continuous film production for battery electrodes for primary and secondary batteries, for example lithium ion batteries, lithium sulfur batteries, sodium sulfur batteries, solid-state batteries, supercap electrodes, electrodes for fuel cells, electrodes for electrolytic cells, electrodes for further electrochemical elements, but also filter membranes or adsorptive coatings through the use of porous particles, decorative layers, optical layers for absorption and/or layers of moisture-sensitive or solvent-sensitive materials is thus enabled.

Figure 3:
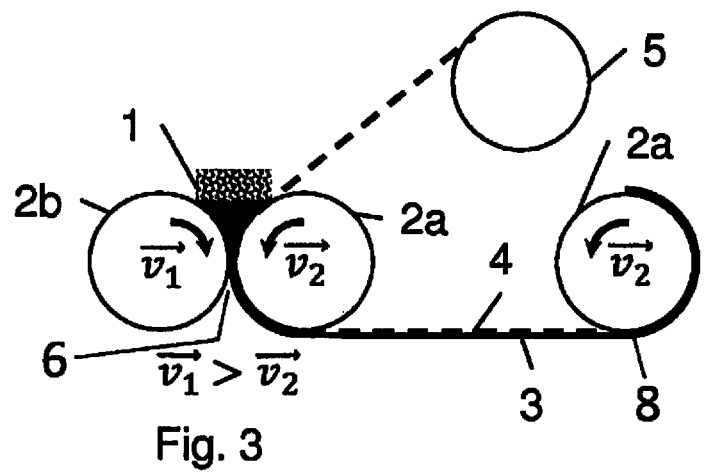
FIG. 3 shows a view, corresponding to FIG. 1, of the rolling device with substrate feed.

FIG. 3 shows in a schematic lateral view corresponding to FIG. 1 a further illustrative embodiment of the invention, in which the substrate 4 is wound in the form of a foil onto a substrate roller 5 and is introduced in foil form into the nip 6, so that the forming dry film 3 is laminated directly in the nip 6 to the substrate 4. In this illustrative embodiment, the dry film 3 is no longer mounted directly, thus in directly touching contact, on the first roll 2a, but is run only indirectly on the first roll 2a and wound onto a further roll 2a.

The described method therefore allows an electrode to be produced directly from a premixed dry film powder without additional steps for fibrillation purposes, so that also no free-standing film has to be formed. The method can be employed for a prefibrillation, in which an enhancement of the mechanical stability of the dry film is possible. Moreover, the free-standing film can be realized by detachment from the carrier roller. By the peripheral speed or the rotational peripheral speeds of the first roll 2a and the second roll 2b and of the pressing force acting in the direction of the calender nip 6 or a nip 6 between rolls, a load and density can be set. The dry film formation is realized in a self-dosing manner, the resulting layer thickness derives from the used pressing force of the two rolls 2a and 2b. Via a continuous input of a specific (process-parameter-adapted) powder quantity, for instance via the powder conveyor 1 or a feed substrate, a pre-dosing is realized. In this way, the layer thickness can likewise be influenced.

The mechanical stability of the dry film 3 is set by the pressing forces and rotation speeds (shearing rates) which are used. In comparison to free-standing films, which, given equal rotation speeds of the rolls 2a and 2b, have merely been pressed in the nip 6, the dry films 3 produced with the proposed method exhibit a considerably increased mechanical stability.

Only those features of the various embodiments which are disclosed in the Illustrative embodiments can be combined with one another and individually claimed.

The invention claimed is:
1. A method for producing a dry film, in which
a dry powder mixture is processed into the dry film by a rolling device having a first roll and a second roll, wherein
the first roll has a higher rotational peripheral speed than the second roll and the dry film is supported on the first roll, wherein a ratio of the rotational peripheral speed of the first roll to the rotational peripheral speed of the second roll of 10:5 to 10:1 is maintained, and wherein the dry powder mixture contains polytetrafluoroethylene.

2. The method as claimed in claim 1, wherein the rolling device is a calendar rolling device.

3. The method as claimed in claim 1, wherein for the production of the dry film, the dry powder mixture is a non-flowable dry powder mixture.

4. The method as claimed in claim 1, wherein the first roll is provided with an adhesion-enhancing modification, and/or the second roll is provided with an adhesion-reducing modification.

5. The method as claimed claim 1, wherein the dry film is applied to a substrate, wherein the substrate, for the application, is moved at a speed equal to the rotational peripheral speed of the first roll.

6. The method as claimed in claim 5, wherein the substrate is moved over the first roll while the dry film is formed on the substrate.

7. The method as claimed in claim 1, wherein the dry film is formed by the first roll and the second roll with a linear force, acting in the nip between the rolls, of 100 N/cm to 10 kN/cm.

8. The method as claimed in claim 5, wherein the substrate consisting of a metallic material is used.

9. The method as claimed in claim 5, wherein prior to the lamination of the dry film on the substrate, the substrate is provided with a thermoplastic primer.

10. The method as claimed in claim 5, wherein the substrate consisting of an expanded metal, a metal wire mesh, a nonwoven fabric, a copper foil or an aluminum foil with an applied carbon primer is used.

11. The method as claimed in claim 1, wherein the dry film is formed with a thickness less than 500 µm.

12. The method as claimed in claim 1, wherein the dry powder mixture, contains a conductive additive, porous carbon, a transition-metal oxide and/or sulfur.

13. The method as claimed in claim 1, wherein by shearing in a nip, the dry film is formed which has fibrils formed anisotropically in the rotational direction of the first and second rolls.

14. The method as claimed in claim 1, wherein a formation of a structuring of the dry film in strip form, or in rectangle form in the rotational direction of the second roll is achieved by coating an adhesion-enhancing primer layer on respective substrate surface regions.

* * * * *